(12) United States Patent
Kokubun

(10) Patent No.: US 6,263,062 B1
(45) Date of Patent: Jul. 17, 2001

(54) DEALING CALL TERMINAL DEVICE

(75) Inventor: Yoshiyuki Kokubun, Koriyama (JP)

(73) Assignee: Hitachi Telecom Technolgies, Ltd., Koriyama (JP)

( * ) Notice: Subject to any disclaimer, the term of this patent is extended or adjusted under 35 U.S.C. 154(b) by 0 days.

(21) Appl. No.: 09/155,866

(22) PCT Filed: Feb. 6, 1998

(86) PCT No.: PCT/JP98/00508

§ 371 Date: Oct. 7, 1998

§ 102(e) Date: Oct. 7, 1998

(87) PCT Pub. No.: WO98/35487

PCT Pub. Date: Aug. 13, 1998

(30) Foreign Application Priority Data

Feb. 7, 1997 (JP) .................................................... 9-038600

(51) Int. Cl.$^7$ ............................ H04M 1/00; H04M 11/00

(52) U.S. Cl. ....................................... 379/164; 379/93.23

(58) Field of Search ..................................... 379/156, 157, 379/164, 165, 355, 354, 356, 357, 433, 428, 93.17, 93.23; 345/418, 7, 426, 431, 901, 905

(56) References Cited

U.S. PATENT DOCUMENTS

| | | | |
|---|---|---|---|
| 4,536,621 | * 8/1985 | Bergen et al. | 179/99 R |
| 4,570,035 | * 2/1986 | Pinede et al. | 379/164 |
| 5,046,086 | * 9/1991 | Bergen et al. | 379/156 |
| 5,309,509 | * 5/1994 | Cocklin et al. | 379/165 |
| 5,465,292 | * 11/1995 | Takahashi et al. | 379/164 |
| 5,878,123 | * 3/1999 | Boakes | 379/156 |
| 6,044,136 | 3/2000 | Takahashi et al. | 379/93.23 |

* cited by examiner

Primary Examiner—Curtis Kuntz
Assistant Examiner—Rexford Barnie
(74) Attorney, Agent, or Firm—Foley & Lardner

(57) ABSTRACT

A dealing communication terminal apparatus of a pagination type is enabled to accommodate at least one communication terminal apparatus, public lines and private lines and to connect exchangingly them. The communication terminal apparatus 300 comprises a color display device 101 for displaying the names of lines, auto dial other property, and functions, a line key panel 102 laminated on the display device 101 and provided with button portions opposite to the line name indication portion of the display device 101, and a main control device 303 and a display control device 304 exchangingly for displaying a plurality of line button accommodation screens or function button accommodation screens in the display device 101 by operations of the fixed function buttons 103A, 103B, each provided in the communication terminal apparatus.

5 Claims, 10 Drawing Sheets

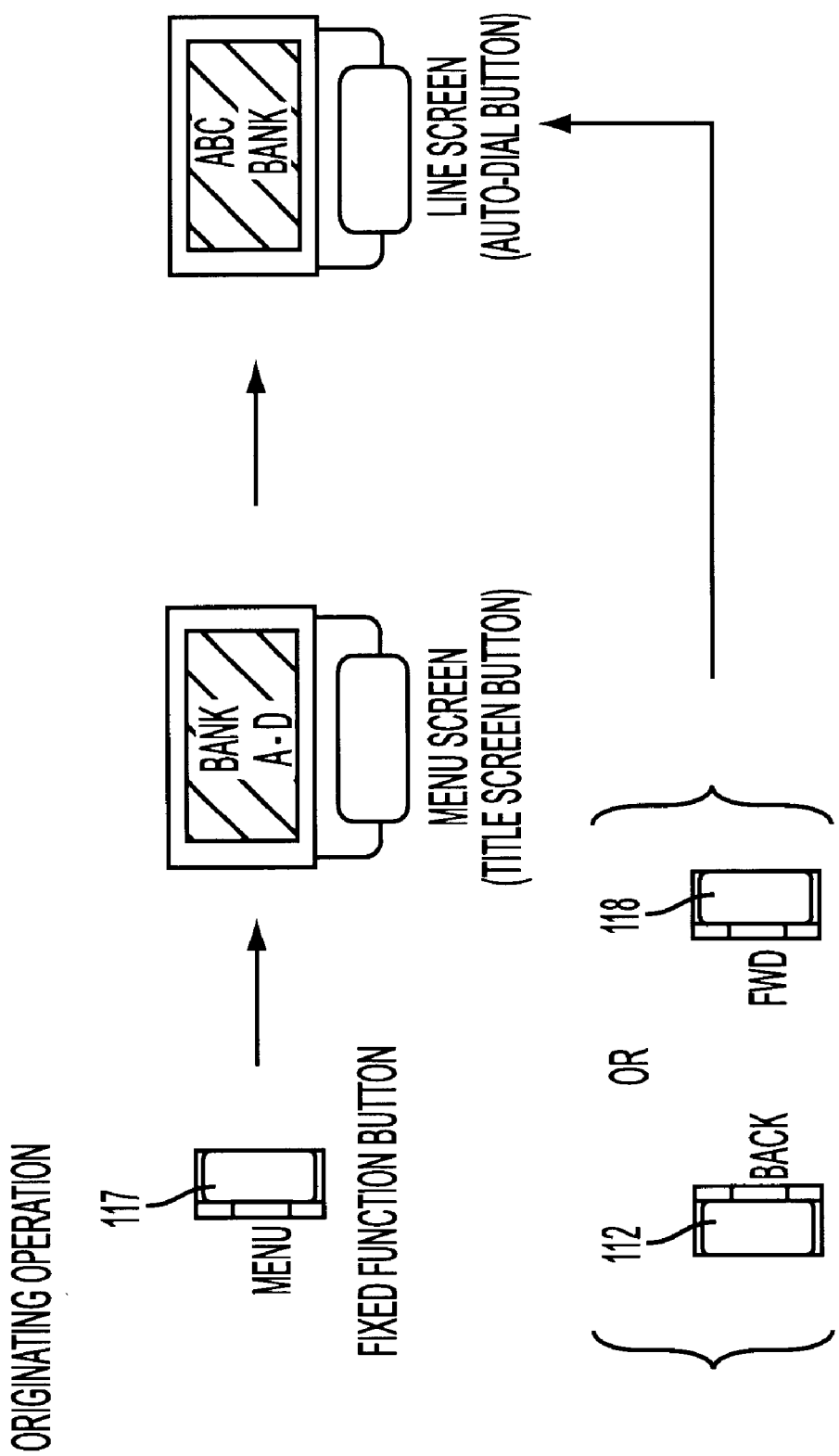

DEALING CALL TERMINAL DEVICE

TECHNICAL FIELD

The invention relates to a dealing communication terminal apparatus of a pagination type in the dealing communication system used in financial transaction of futures such as bills and securities in banks and stock companies.

BACKGROUND TECHNOLOGY

According to the prior art, the dealing communication terminal apparatus in the conventional dealing communication system had to have a number of buttons because many lines, many private lines and many auto-dial buttons are accommodated in the dealing communication terminal apparatus. These buttons have labels stuck thereon, which the names of lines and functions is printed on the labels. According to another dealing communication terminal apparatus of the pagination type using the display devices, the touch panels of the photosensitive type and pressure sensitive type etc. are employed. The touch-input operation carries out the originating and the response to the incoming call of lines.

However, according to the conventional dealing communication terminal apparatus provided with a number of buttons as mentioned above, one single communication terminal apparatus becomes a large size. When such large size apparatus is installed or placed on a desk of the dealer, the working space on the desk becomes little. This is a problem. Also, since the names of lines and functions is printed on the labels and they are stuck on the buttons to express the names, it is necessary to form new labels and stick them on the buttons at every times of changing the registered lines and functions. Further, it is impossible, with respect to starting the user's screens that are respectively registered, to open the terminals to a plurality of users by means of inputting the passwords. Therefore, it is necessary to prepare respective and individual communication terminal apparatuses to each user.

Some dealers want to have the feeling of pressing the button when they manually operate the input portion because the dealer are necessitated to operate these buttons speedily and correctly to originate or respond to the incoming call. According to the conventional dealing communication terminal apparatus of the pagination type, the input portion uses the touch panels of the photo sensitive type and the pressure sensitive type etc., so that there are inconveniently no feeling of pressing the button when the dealer pushes down these buttons.

The invention solves the problems described above of the prior art. The purpose of the invention is to provide a dealing communication terminal apparatus of the pagination type, the dealing communication terminal apparatus enabling to ensure a sufficient working space on the desk, to realize easily a change of line accommodation, to open one communication terminal apparatus to a plurality of users through the passwords, and to obtain a firm and correct operation feeling of pressing button.

DISCLOSURE OF THE INVENTION

An invention according to one aspect is a dealing communication terminal apparatus having a pagination function and enabling to accommodate at least one communication terminal apparatus and line and to connect them, wherein the communication terminal apparatus comprises a display means for displaying a line button accommodation screen or a function button accommodation screen, a line key panel having button portion opposite to the line name indication portion of the display means, a memory means for memorizing image data related to the line button accommodation screen or the function button accommodation screen, and a control means for reading image data out of the memory means when detecting that a fixed function button provided on the communication terminal apparatus is operated, and for exchangingly displaying the line button accommodation screen or the function button accommodation screen related to the image data read out of the memory means.

According to another aspect of the invention, the line key panel is stuck on the display means, the line key panel gives a stroke feeling to the button portion, and corresponds the button portion to the line name indication portion of the display means.

According to another aspect of the invention, the memory means memorizes the image data related to the line button accommodation screen or the function button accommodation screen and corresponding to the individual user, and the passwords corresponding to the image data, the control means can change the image data related to the screen contents of the line button accommodation screen or the function button accommodation screen memorized in the memory means when detecting that the predetermined operation is carried out, and further read the image data corresponding to the input password out of the memory means when the password is input.

Consequently, according to the invention, the communication terminal apparatus of the pagination type is able to miniaturize the communication terminal apparatus and to ensure the sufficient working space on the desk without any effects on the public line, the private line and the auto-dial number that are accommodated in the communication terminal apparatus. Further, because the communication terminal apparatus is freely used by a plurality of users by inputting their own passwords and a single communication terminal apparatus can be used in a time shearing system, the financial dealing business can use the apparatus at all times of the day in order to deal securities with other countries having difference in time. Still further, the pagination system of the dealing communication terminal apparatus is able to enjoy the firm and correct operation feeling of pressing the button.

BRIEF DESCRIPTION OF THE DRAWINGS

FIG. 7(A) is an explanation view showing an originating procedure by an auto-dial.

THE BEST MODE FOR EMBODYING THE INVENTION

Here, the embodiment of the invention will be explained with reference to FIG. 1 through FIG. 8.

Figure 1:
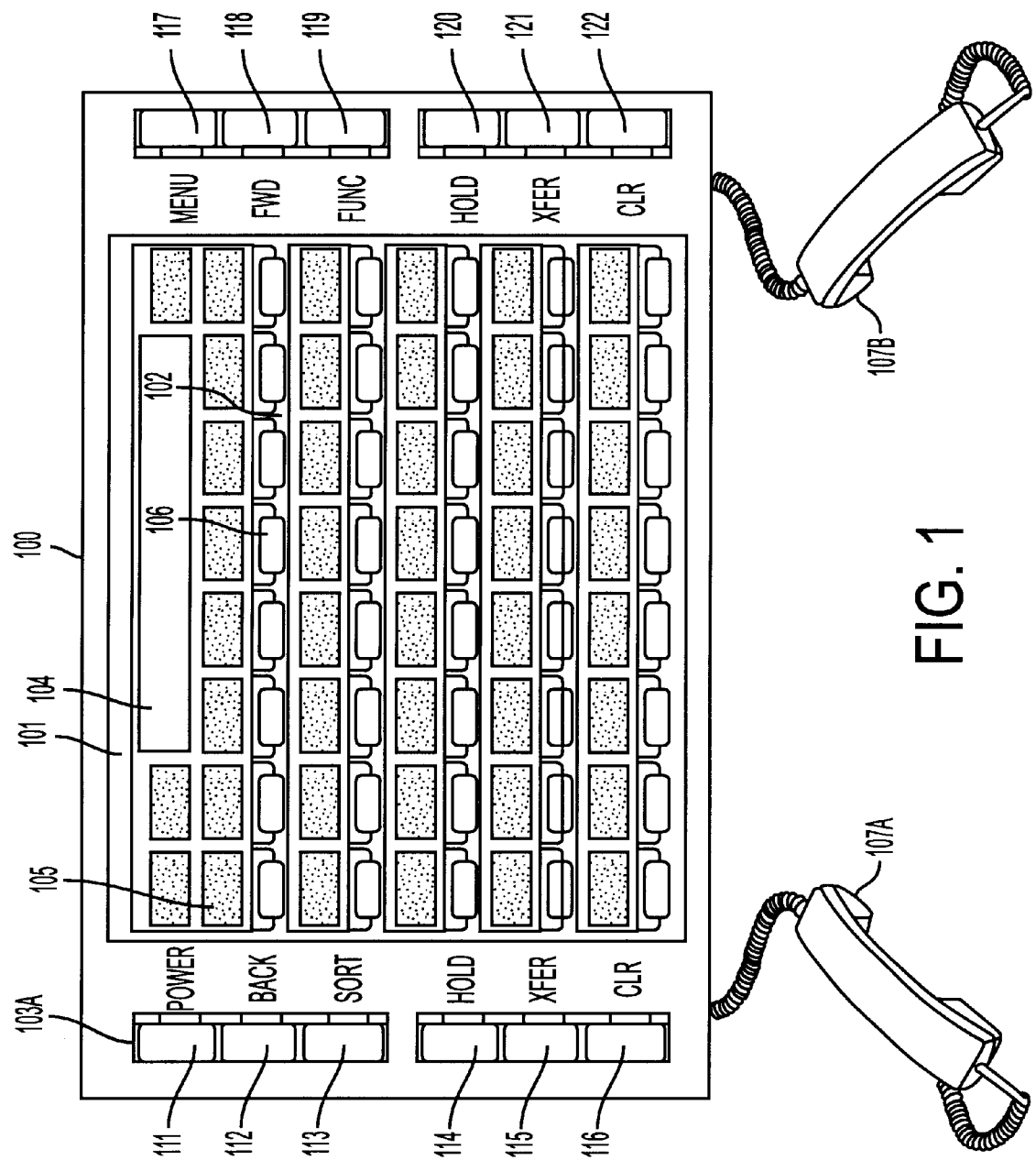
FIG. 1 is a plane view depicting a board face of the dealing communication terminal apparatus according to an embodiment of the invention.
Figure 2:
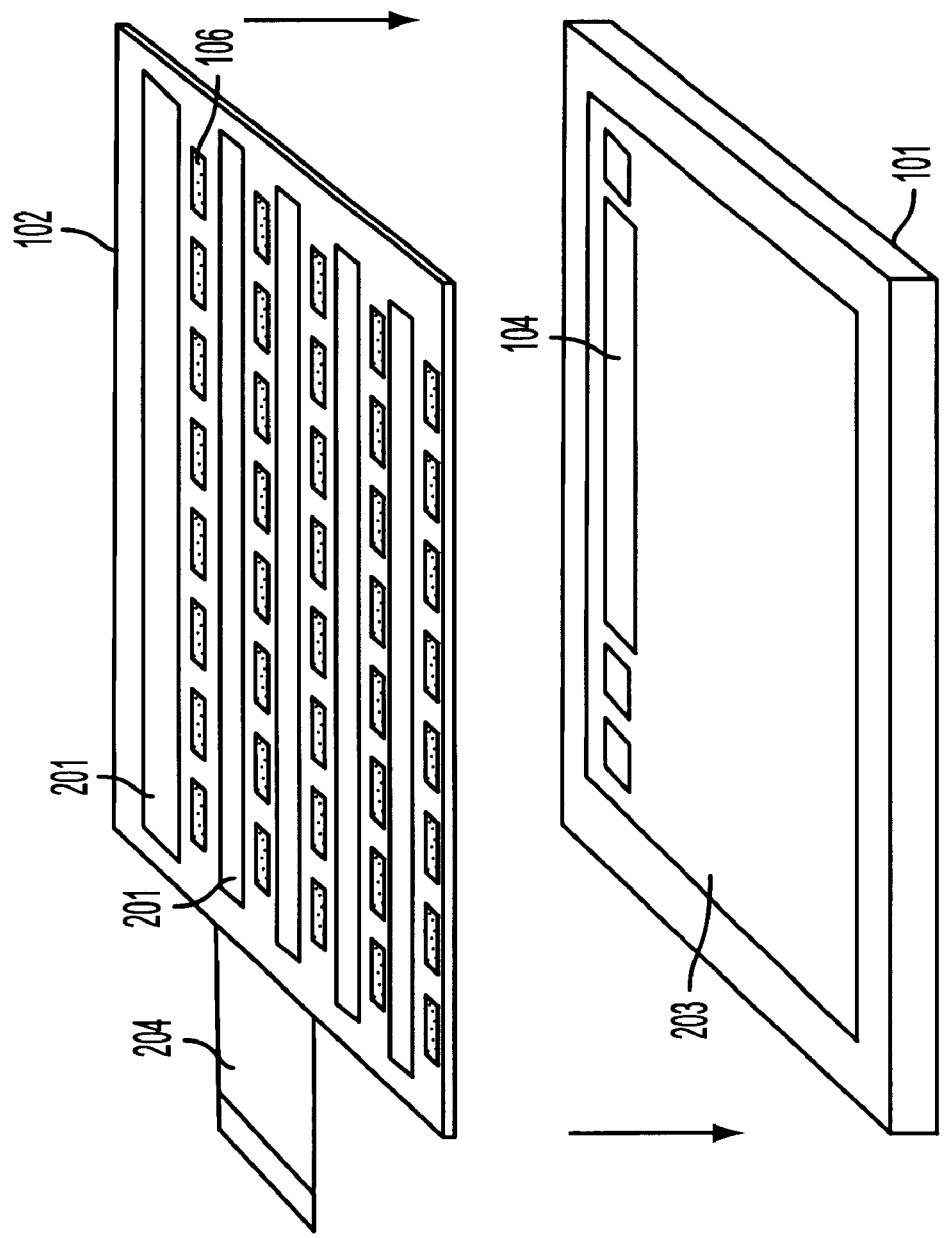
FIG. 2 is an exploded perspective view showing a relation between a key panel and a display device of the dealing communication terminal apparatus according to the embodiment of the invention.
Figure 3:
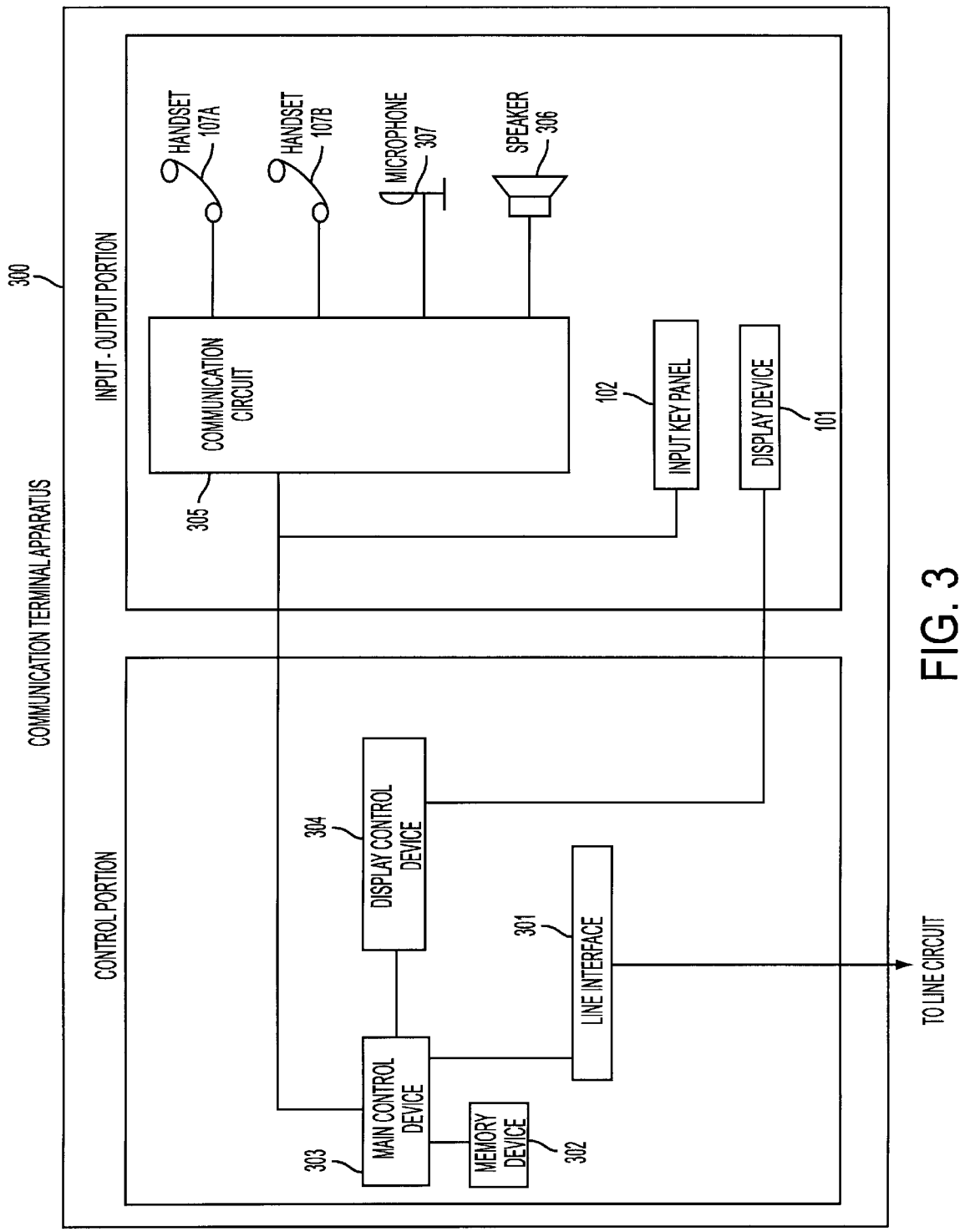
FIG. 3 is a block diagram showing a structure of the dealing communication terminal apparatus according to the embodiment of the invention.

FIG. 1 is a plane view depicting a board face of the dealing communication terminal apparatus according to the embodiment of the invention. FIG. 2 is an exploded view showing a relation between a key panel and a display device of the dealing communication terminal apparatus according to the embodiment of the invention. FIG. 3 is a block diagram showing a structure of the dealing communication terminal apparatus according to the embodiment of the invention.

As shown in FIG. 1, a color display device 101 is provided on the board face of the dealing communication terminal body 100, and a key panel 102 is provided on the color display device 101. Further, fixed function key groups 103A and 103B operated or used frequently are arranged on the left and the right portions of the board face of the dealing communication terminal body 100. A left communication handset 107A and a right communication handset 107B are connected to the dealing communication terminal body 100.

As shown in FIG. 2, the color display device 101 and the key panel 102 are formed by directly bonding the key panel 102 onto the display portion 203 of the color display device 101.

Consequently, the key panel 102 gives a stroke feeling felt in pushing a button, which is not provided in ordinary touch sensors, giving a correct and firm feeling of manual operation to the users. The key panel 102 has indication confirmation areas 201 extending along its row direction and buttons 106 corresponding to the indication confirmation areas arranged along its row direction. These areas 201 and buttons 106 are alternately arranged along a line direction of the key panel 102. 204 shows connection wiring portion of the key panel 102.

Further, the display portion 203 of the color display device 101 has line names, auto-dial opposite party names, and function names which are displayed on the positions corresponding to the indication confirmation areas 201 of the key panel 102 with frames showing name indication portions (area) 105. Respective name indication portions (area) 105 can be indicated correspondingly to position of respective buttons 106 when the buttons 106 corresponding to respective name indication portions 105 are pushed down. The display portion 203 of the display device 101 has a dial/message indication portion 104 for confirming the operational contents and the dial contents in the originating dial operation.

As shown in FIG. 1, the fixed function key group 103A at the left side has a power button 111 for functioning ON/OFF of the power source of the dealing communication terminal apparatus, a backward BACK button 112 for turning (return) the screen pages, SORT button 113 for displaying a closing of other page incoming call screen, an incoming call private screen, a holding HOLD button 114, a transferring XFER button 115, and a connecting-disconnecting CLR button 116. The fixed function key group 103B at the right side has a MENU button 117 for displaying the menu screen, a forward FWD button 118 for turning (lead) the screen pages, a FUNC button 119 for displaying the function screens, a holding HOLD button 120, a transferring XFER button 121, and a connecting-disconnecting CLR button 122.

As shown in FIG. 3, the dealing communication terminal apparatus 300 has a control portion and an input/output portion. The control portion is structured by a main control device 303 for controlling the whole apparatus, a display control device 304 for controlling the color display device 101, a memory device 302 for storing data such as programs, public data, and image data, and a line interface 301 for interfacing the control portion and a line circuit. Additionally, the input/output portion is structured with a communication circuit 305 connected to the main control apparatus 303 of the control portion, the speaker 306, the microphone 307 and the left and the right handsets (originating/responding sets) 107A, 107B, respectively connected to the communication circuit 305, the key panel 102 connected to the main control device 303 of the control portion, and the color display device 101 connected to the display control device 304.

Figure 4:
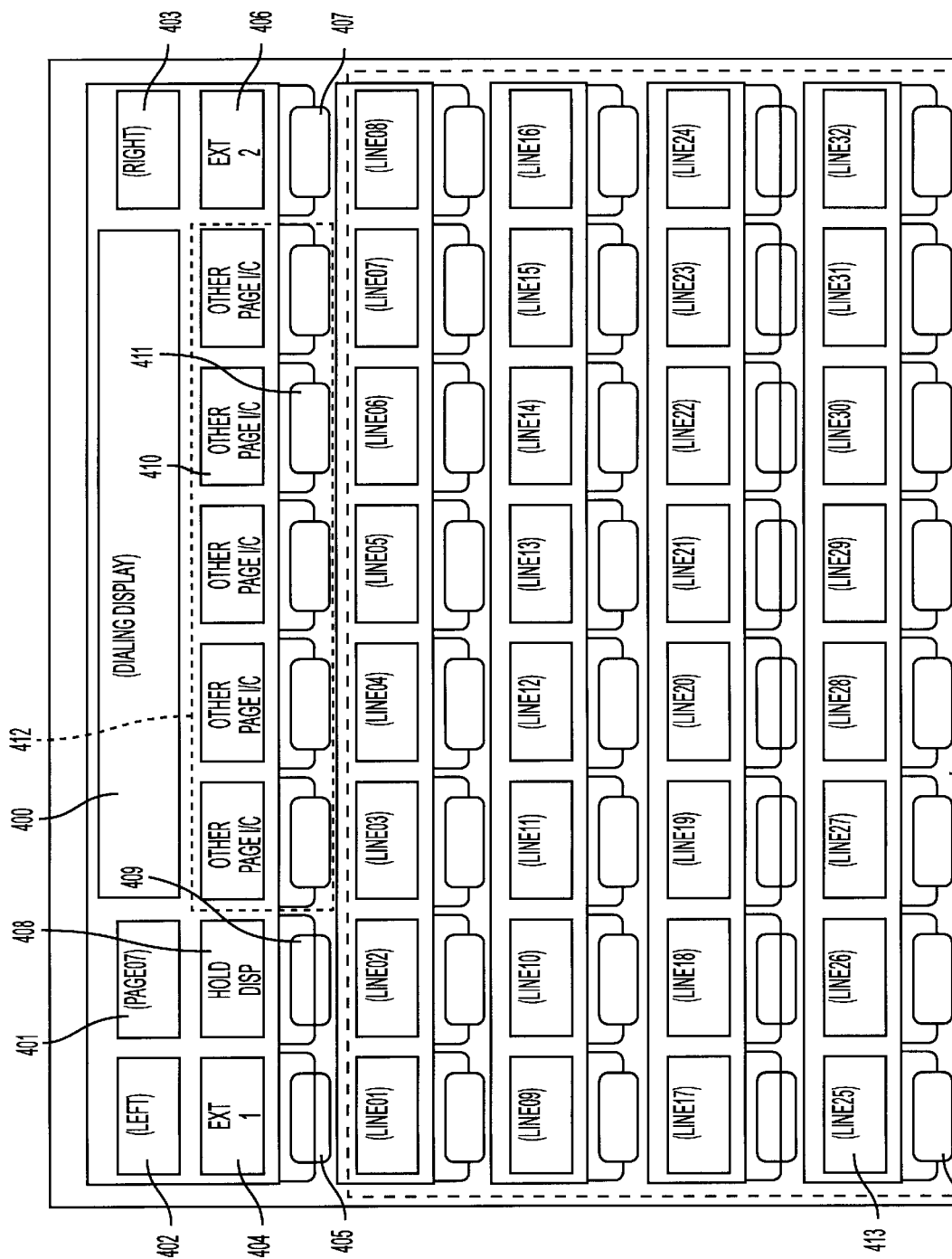
FIG. 4 is an explanation view showing one example of a line screen of the dealing communication terminal apparatus according to the embodiment.

FIG. 4 shows an example of the line screen of the dealing communication terminal apparatus according to the embodiment of the invention. As shown in FIG. 4, the line screen is structured with a dial/message indication portion 400, a screen title indication portion 401, a communication other party indication portion 402 for the left handset 107A and a communication other party indication portion 403 for the right handset 107B, a left side system extension 1 indication portion 404 and a left side system extension 1 use button 405, a right side system extension 2 indication portion 406 and a right side system extension 2 use button 407, a self holding indication portion 408 and a holding response button 409 for responding to the line on the self holding indication portion 408, other page incoming call indication area 412 having plural other pages incoming call indication portions 410 and incoming call response buttons 411 for responding to the line on the other pages incoming call indication portion 410, and a line/auto-dial indication area 415 having plural line/auto-dial name indication portions 413 and plural line/auto-dial originating/responding buttons 414.

These indication contents of the screen title indication portion 401, the communication other party indication portion 402, the self holding indication portion 408, and other page incoming call indication portion 410 are displayed by the registered contents and the registered indication colors in perspective screen. With reference to the title indication of the line/auto-dial, it is possible to register the titles by color sorting according to the importance of the line, the kind (public line, private line and the like) of the line and the high frequency in use auto-dial. As a result, it is possible to make the user easy to see the title indication and to improve the operability in the originating/responding to the line.

In addition, it is possible to indicate as many as five other pages incoming call indications according to the embodiment of the invention shown in FIG. 4. Therefore, without turning these pages, this communication terminal apparatus can confirm the indication contents of five lines with reference to the incoming call that are accommodated in other pages and respond to the incoming call in other page. The 32 (thirty-two) line/auto-dials can be accommodated in one page screen and 32 buttons can be used in one page screen.

Pressing the MENU button 177 shown in FIG. 1 can directly indicate respective pages. Pressing the FWD button 188 or the BACK button 112 can turn respective pages. As a result, it is possible to accommodate much capacity of 27 pages (screens)*32 buttons.

Figure 5:
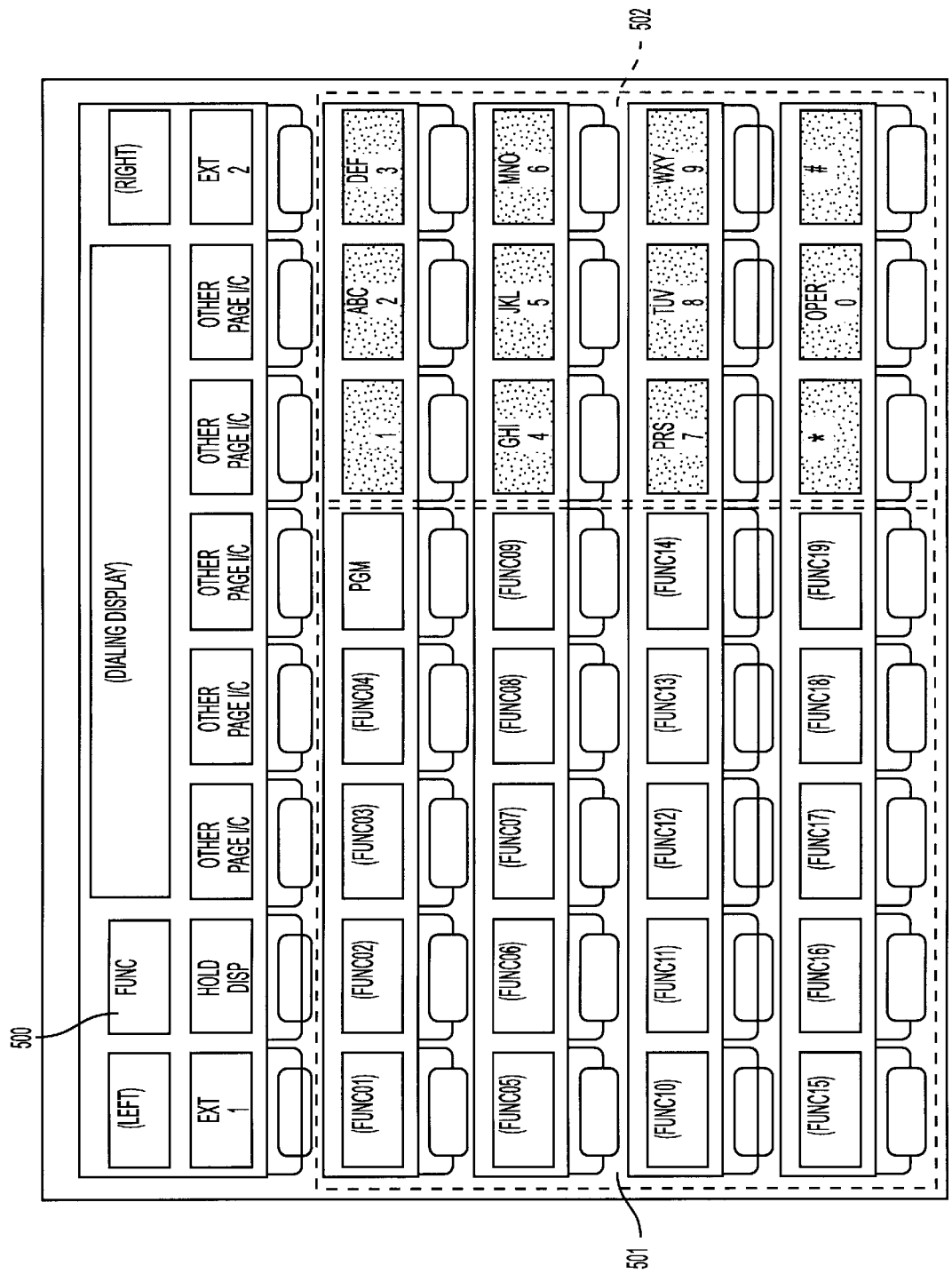
FIG. 5 is an explanation view showing one example of a function screen of the dealing communication terminal apparatus according to the embodiment.

FIG. 5 shows an example of the function screen of the dealing communication terminal apparatus according to the embodiment of the invention. As shown in FIG. 5, 500 shows a function screen title indication portion. The function screen can accommodate the function key registration portion 501 and the dial pad portion 502 in the area of the line/auto-dial accommodation portion (32 buttons) of the line screen shown in FIG. 4. One function key group of the dial pad portion 502 is structured with twelve (12) buttons. These twelve buttons are sorted in colors by making them illuminated in the colors different respectively from that of the buttons of the function key registration portion 501. Thus, the user can recognize these buttons of one color as of a particular group buttons.

The function key registration portion 501 is provided with buttons of function key func 01 to func 19. The function keys func 01 and func 02 express the buttons of I/C DSP 1, I/C DSP 2 for displaying the incoming call private screen. The function key func 04 expresses the button of INTA TALK for functioning intercommunication, all at once order and group order. The function key func 05 expresses the button of BD CHG for changing seats. The function key func 06 expresses the button of REC OFF for stopping a record output. The function key func 07 expresses the button of MON SET for setting the monitor line (16ch). The function key func 08 shows the button of MON SELECT for exchanging the set contents of the monitor. The function key func 09 shows the button of RING OFF for stopping the incoming call ringer sound. The function key func 10 shows the button of LNR for originating again to the last other party. The function key func 11 shows the button of CALL FWD for transferring the incoming call to the registered object when the incoming call is received during a user's absence. The function key func 12 shows the button of DIAL L/R for exchanging the sending of dialing by the left and the right handsets. The function key func 13 shows the button of LEFT R sending a hooking signal to the communication object of the left handset. The function key func 14 shows the button of RIGHT R for sending a hooking signal to the communication object of the right handset. The function key func 15 shows the button of LEFT VOL for setting a volume of the left handset communication. The function key func 16 shows the button of RIGHT VOL for setting a volume of the right handset communication. The function key func 17 shows the button of RING VOL for setting a volume of the incoming call ringer sound. The function key func 18 shows the button of UP for raising a volume of the speaker. The function key func 19 shows the button of DOWN for lowering a volume of the speaker.

As described above, respective function keys can be sorted in colors according to the frequency in use and the kinds of function. By sorting each group by one color such as of the dial pad and the volume control buttons, it is possible further to improve the operability of the apparatus. It is noted that exchanging of the function screen and the line screen can be done through the FUNC button 119 of the fixed function button group 103B shown in FIG. 1.

Figure 6:
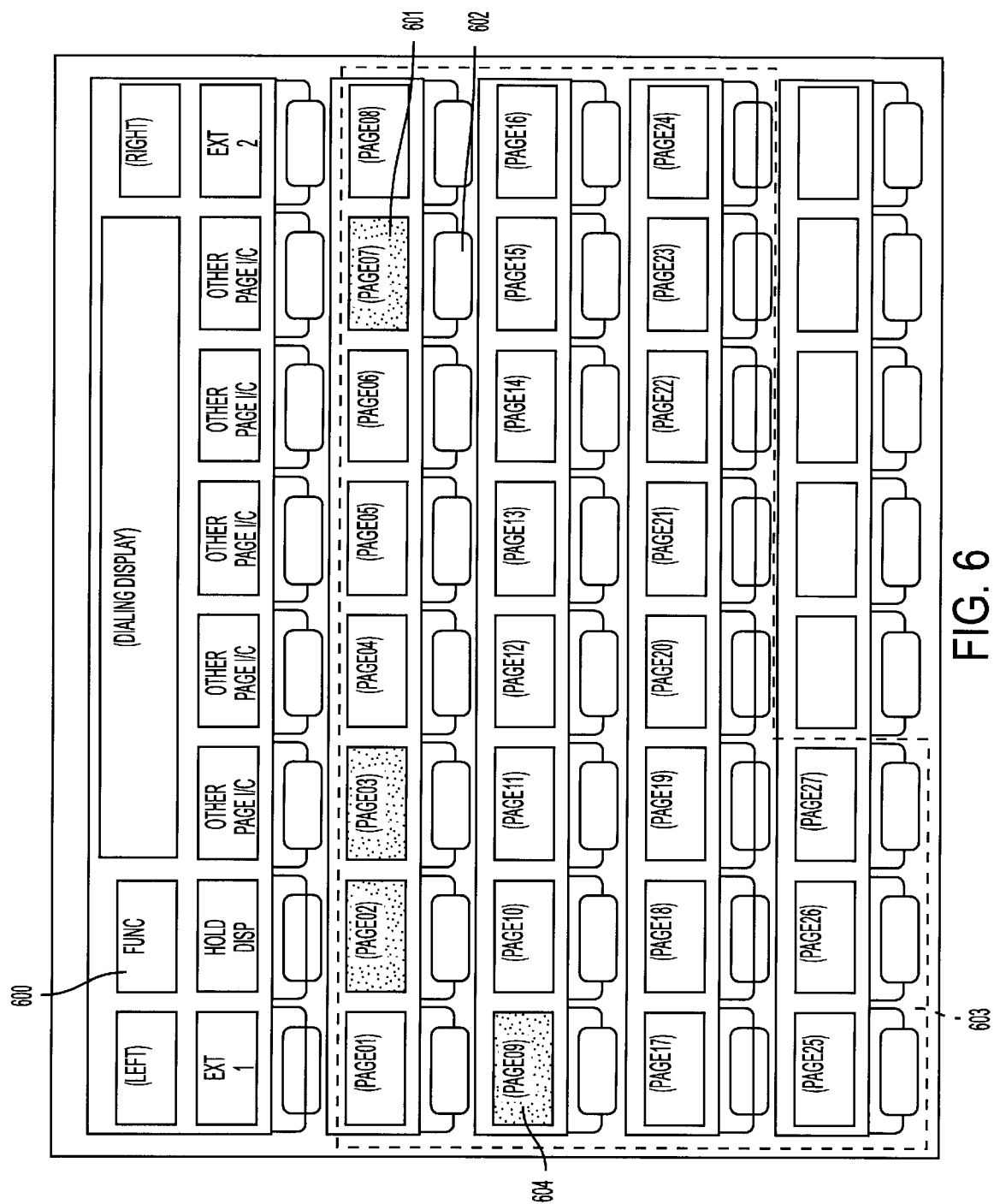
FIG. 6 is an explanation view showing one example of the menu title screen of the dealing communication terminal apparatus according to the embodiment.

FIG. 6 shows a menu title screen for exchanging respective screens and the title indication of the line screens (27 screens) of the dealing communication terminal apparatus according to the embodiment of the invention. As shown in FIG. 6, 600 is a menu screen title indication portion and 603 is a line screen title indication and transfer button group (27 pieces).

With reference to the menu screen, an area of the line/auto-dial accommodation portion (32 buttons) of the line screen indicates these titles of line screens of 27 pages. These titles are able to transfer to respective corresponding screen by pushing down the button corresponding to the title. Further, the screen used frequently by the user are colored by him with a particular color in order to color sort the titles of the users as shown by the reference numeral 604. The user can color the indication screen in the last time (for example, page 07) with a color different from other color indicating as shown by the reference numeral 601. Thus, a user interface can be enjoyed. A reference numeral 603 shows a button for transferring the screen corresponding to the indication. Also, a transfer to the title screen is done by pushing down the MENU button 117 of the fixed function button group 103B shown in FIG. 1.

Next, the method of using the dealing communication terminal apparatus according to the embodiment of the invention that is structured as mentioned above will be explained with reference to FIG. 7 and FIG. 8.

Figure 7B:
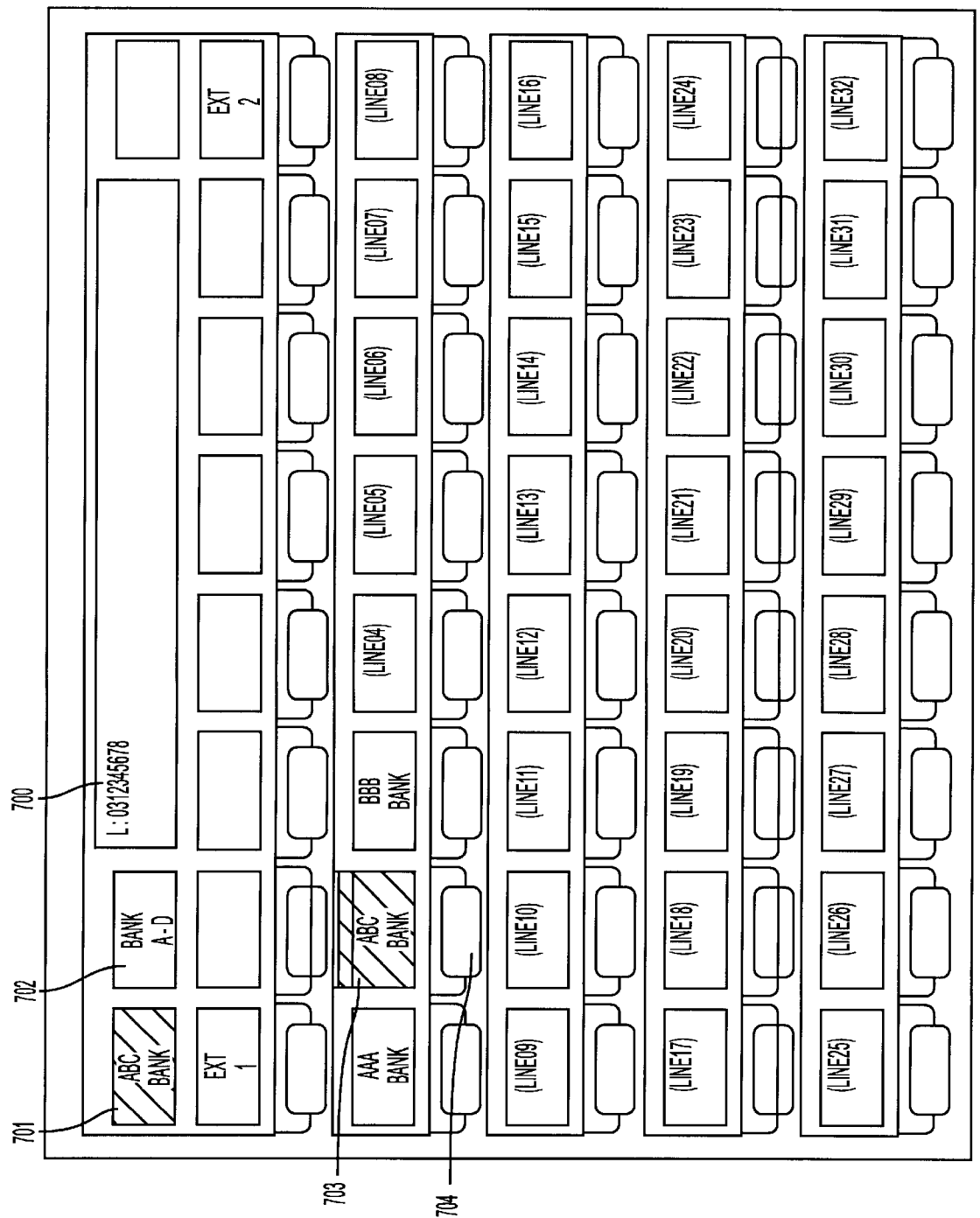
FIG. 7(B) is an explanation view showing one example of the line screen of the dealing communication terminal apparatus according to the embodiment.

FIG. 7(A) shows an explanation view showing an originating procedure by using the auto-dial and FIG. 7(B) is an indication example of the line screen of the dealing communication terminal apparatus functioning in the originating procedure.

When the dealer uses an auto-dial and originates to the auto-dial target, first he pushes down the MENU button 117 shown in FIG. 1 to display the screen having the auto-dial target, resulting in an indication of the menu title screen shown in FIG. 6 in the display device. The line screen is selected from the menu screen title indication portions (the name registration indication can be freely done) displayed in the menu title screen and the line screen shown in FIG. 4 is displayed. Operating the FWD button 118 or the BACK button 112 shown in FIG. 1 opens the screen and the necessary line screen can be found. Next, the registered auto-dial button is searched among the other portions registered in the line screen, then the searched button is pushed down to originate the line of the auto-dial target. Here the user sorts or classifies freely in color the pages of the line screen registered and the auto-dial buttons registered. As the user can recognize them by the particular color, it is possible to make the user easy to see them, to shorten the search time, and make operational mistakes few.

FIG. 7(B) is a line screen displayed together with a processing of the originating procedure above. The dial indication portion 700 indicates therein the dial number "0312345678" to be originated, the left handset communication other party indication portion 701 indicates the left handset other party "ABC bank", and the screen title indication portion 702 indicates the use line screen title "Bank A–D". The line/auto dial name indication portion 703 indicates that the line of ABC bank of other party of left handset is busy by being lit the green light.

When the line (public line) button is used to originate without using the auto-dial, the line/auto dial button 704 shown in FIG. 7(B) is pushed down. After the line/auto-dial button 704 is pushed down, it is exchanged automatically to the function screen shown in FIG. 5. Then, operating the dial button of the dial pat portion 502 in the function screen carries out the originating to the operated dial number.

Figure 8A:
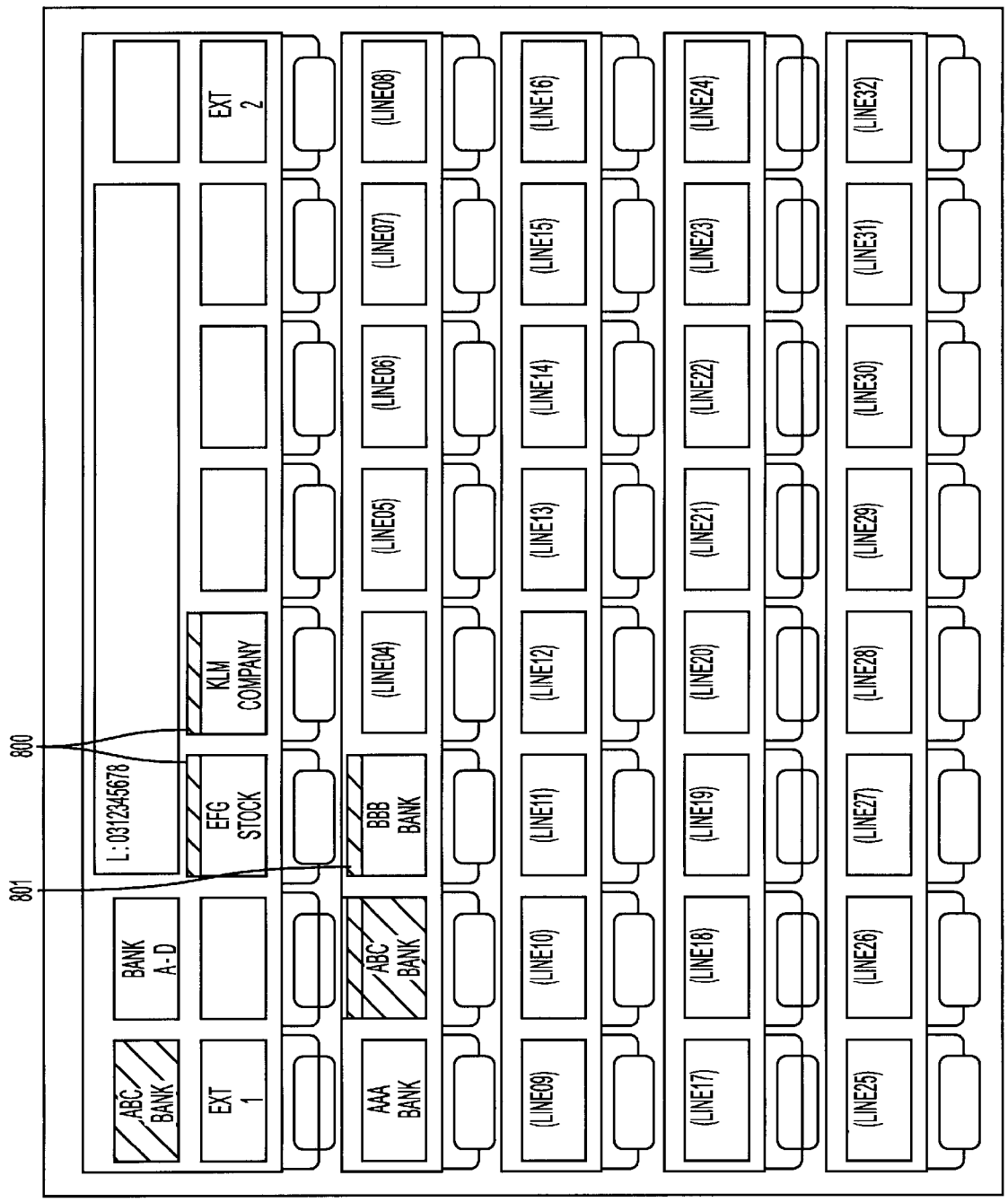
FIG. 8(A) and FIG. 8(B) are explanation views showing a response to an incoming call response indication screen of the dealing communication terminal apparatus according to the embodiment.

Next, dealer's operation responding to the incoming call will be explained with reference to FIG. 8. FIG. 8(A) and FIG. 8(B) show the incoming call response indication screen of the dealing communication terminal apparatus.

When the dealer responds to an incoming call, even though a dealer has opened any screen of the dealing communication terminal apparatus or already a communication has been carried out, the incoming call indication, as the contents identical with that of the registered line indication, is carried out in the other page incoming call indication portion 410 provided in the area of the other page incoming call group 412 of the line screen shown in FIG. 4. For example, as shown in FIG. 8(A), the other page incoming call indication portion 800 indicates "EFG stock", "KLM company" and the upper portion of the name indication flashes swiftly in red color. The user confirms the indicated contents and judges and decides any response to the incoming call. As a result, the area of five other page incoming call groups 412 is effectively used. Further, when the incoming call is responded in the line screen that the user opened, the incoming call of "BBB bank" is directly indicated in the line/auto-dial name indication portion 801 of the line screen.

Figure 8B:
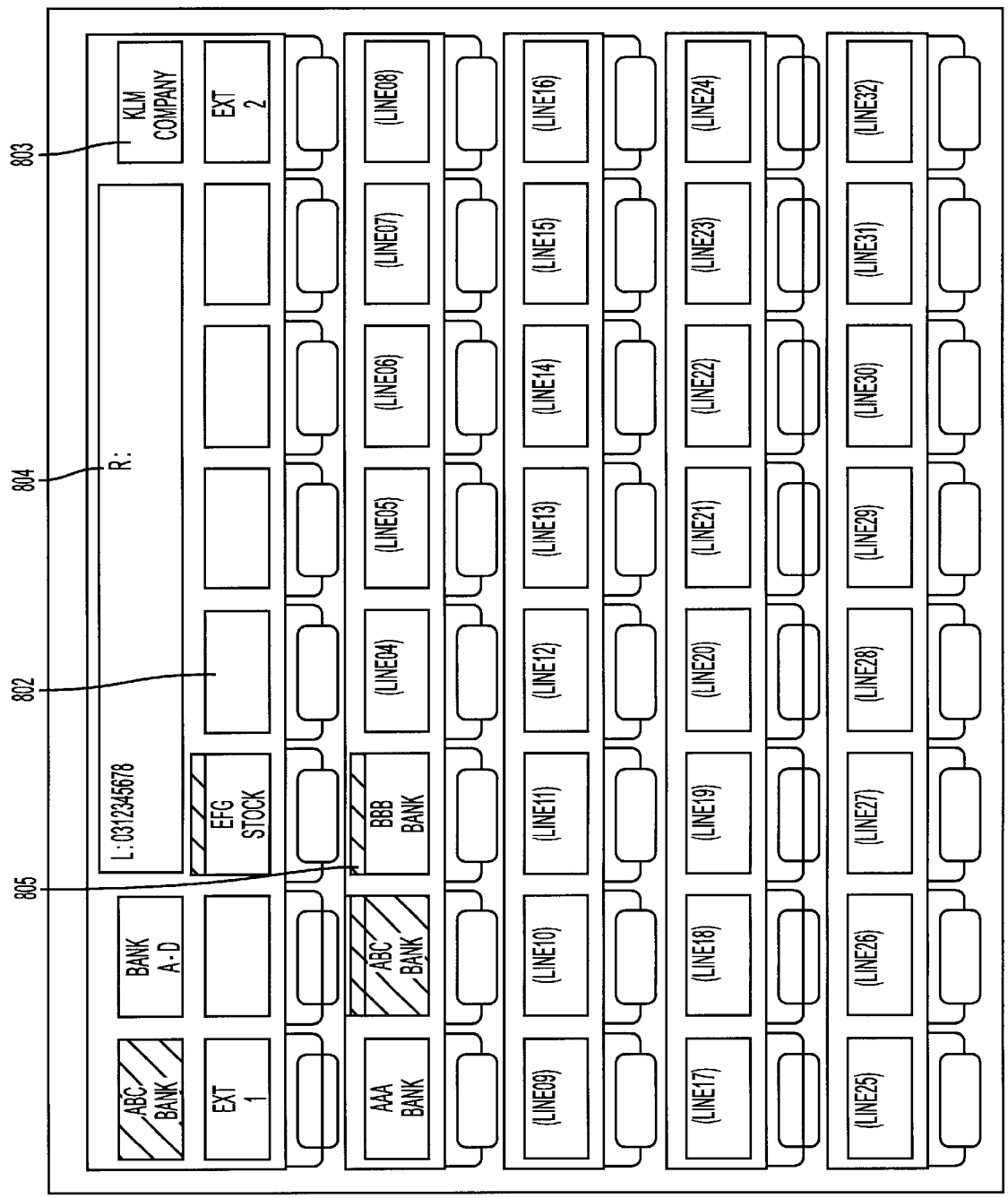

When the incoming call is responded, as shown in FIG. 8(B), the other page incoming call indication contents of the other page incoming call indication portion 802 disappears and "KLM company" is indicated in the right handset communication other party indication portion 803 to show a condition of using the right handset. Further, "R" to show the use of the right handset, and the dial number in the response to the incoming call are indicated in the dial indication portion 804. When the left handset is used, the above explanation is used after it is reversed. When the line screen accommodating the line responded is opened, an orange color light lit indicates that the right handset is busy. When the line/auto-dial name indication portion 805 is the line which is responded by other communication terminal apparatus, a blue color light lit indicates that this line is being used by the other dealing communication terminal apparatus.

When the user mainly responds to the incoming call, operating a FUNC button 119 shown in FIG. 1 transfers it to the function screen shown in FIG. 5. Pushing down function keys func 01, func 02 corresponding to I/C DSP1, I/C DSP2 of the function key registered portion 501 indicates the incoming call private screens 1,2. As a result, the area of the line button functions as the incoming call response button. Thus, when the incoming call occurs, man can confirm the incoming call in the last screen by displaying in one single screen and can respond to the incoming call. At this time, there are the condition indications such as that the left/right handsets are on busy or in the incoming call, that other dealing communication terminal apparatus is busy, as well that the left handset is on holding (slow flashing of green light), that the right handset is on holding (slow flashing of orange light), and that other dealing communication terminal apparatus is on holding (slow flashing of blue light).

In addition, in case that plural users use one dealing communication terminal apparatus through their own registered screens, pushing down the function key func 05 in the function screen shown in FIG. 5, a user can input the passwords in order to change it to one's own registered screen.

Industrial Usability

According to the invention, the communication terminal apparatus of the pagination type is enabled to miniaturize the communication terminal apparatus and ensure the sufficient working space on the desk without effect on the public line, the private line and the number of the auto-dial, which are accommodated. Further, because this single communication terminal apparatus is freely used by a plurality of users by means of inputting their own passwords and can be used in a time shearing system, financial dealing business can use this apparatus at all times of the day in dealing securities business with other countries having difference in time. Furthermore, this dealing communication terminal apparatus of the pagination type is enabled to enjoy firm and correct operation feeling of pressing the button.

What is claimed is:

1. A dealing communication terminal apparatus provided with a pagination function and enabled to accommodate and connect at least one line, the dealing communication terminal apparatus comprising:

a display means for displaying a line button accommodation screen or a function button accommodation screen including a dial pad key;

a line key panel, disposed on the display means, the line key panel having an indication confirmation area opposite to a line name indication portion of the display means, and having a button portion opposite to the line name indication portion;

a memory means for storing image data related to the line button accommodation screen or the function button accommodation screen;

a forward function button for turning from a current screen displayed on the display means to a first different screen to be displayed on the display means, so as to select a desired screen in a plurality of screens;

a backward function button for turning from the current screen displayed on the display means to a second different screen to be displayed on the display means, so as to select the desired screen in the plurality of screens; and a control means for reading image data out of the memory means, the image data being related to screen exchanging in accordance with the turning operation of the forward function button or the backward function button, when detecting the turning operation, and for exchangingly displaying one of the plurality of screens on the basis of the image data read out of the memory means.

2. The dealing communication terminal apparatus according to claim 1, wherein the line key panel is adhered to the display means, giving a stroke feeling to the button portion of the line key panel, and corresponds the button portion to the line name indication portion of the display means.

3. The dealing communication terminal apparatus according to claim 1, wherein the memory means stores the image data related to the line button accommodation screen or the function button accommodation screen and corresponding to an individual user, and the passwords corresponding to the image data, the control means changes the image data related to the screen contents of the line button accommodation screen or the function button accommodation screen stored in the memory means when detecting that a predetermined operation is carried out, and further reads the image data corresponding to the input password out of the memory means when the password is input.

4. A dealing communication terminal apparatus provided with a pagination function and enabled to accommodate and connect at least one line, the dealing communication terminal apparatus comprising:

a display means for displaying a line button accommodation screen or a function button accommodation screen including a dial pad key;

a line key panel, disposed on the display means, the line key panel having an indication confirmation area opposite to a line name indication portion of the display means, and having a button portion opposite to the line name indication portion;

a memory means for storing image data related to the line button accommodation screen or the function button accommodation screen;

a menu function button for storing, on the display means, a menu screen for directly selecting a desired screen from a plurality of screens; and a control means for reading image data out of the memory means, the image data being related to screen exchanging in accordance with the selecting operation of the menu function button, when detecting the selecting operation, and for exchangingly displaying one of the plurality of screens on the basis of the image data read out of the memory means.

5. A dealing communication terminal apparatus provided with a pagination function and enabled to accommodate and connect at least one line, the dealing communication terminal apparatus comprising:

a display unit that displays a line button accommodation screen or a function button accommodation screen including a dial pad key;

a line key panel disposed on the display unit, the line key panel having an indication confirmation area opposite to a line name indication portion of the display unit, and having a button portion opposite to the line name indication portion;

a memory unit that stores image data related to the line button accommodation screen or the function button accommodation screen;

a menu function button disposed adjacent to the display unit and configured to display, on the display unit, a menu screen for directly selecting a desired screen from a plurality of screens; and a control unit that is communicatively connected to the memory unit and that is configured to read image data out of the memory unit, the image data being related to screen exchanging in accordance with the selecting operation of the menu function button, when detecting the selecting operation, and for exchangingly displaying one of the plurality of screens on the basis of the image data read out of the memory unit.

* * * * *